United States Patent [19]

Alegre et al.

[11] 4,345,568

[45] Aug. 24, 1982

[54] MULTI-FUEL VAPOR CHARGER CARBURETION SYSTEM AND DEVICE THEREFOR

[76] Inventors: Adolfo P. Alegre, 119 Bignay St., Quezon City; Armando E. Guidote, Antipolo, Rizal; Alfonso G. Puyat, No. 7 Caimito St., Forbes Park, Makati, Metro Manila, all of Philippines

[21] Appl. No.: 132,786

[22] Filed: Mar. 24, 1980

[30] Foreign Application Priority Data

Sep. 7, 1979 [PH] Philippines .............................. 23009

[51] Int. Cl.³ .......................................... F02M 13/04
[52] U.S. Cl. .................................. 123/522; 123/523
[58] Field of Search ...................... 123/557, 522, 523; 261/119, 121 A, 121 B, 36 A

[56] References Cited

U.S. PATENT DOCUMENTS

| | | | |
|---|---|---|---|
| 2,390,979 | 12/1945 | Young | 123/522 |
| 2,742,886 | 4/1956 | McPherson | 123/522 |
| 3,713,429 | 1/1973 | Dwyre | 123/557 |
| 4,011,847 | 3/1977 | Fortino | 123/522 |

*Primary Examiner*—Ronald H. Lazarus
*Attorney, Agent, or Firm*—Munson H. Lane, Jr.

[57] ABSTRACT

A fuel vapor charge producing device comprising a pure liquid fuel or mixture container which can be of any desired shape and material with a cover and a float secured inside said device to control the inflow of pure liquid fuel or mixture into the container, a fuel or mixture inlet-valve made on said container for the entry of fuel or mixture, an air inlet adapted to allow the entry of air into said container above the liquid or mixture level and another air inlet below the fuel or mixture level such that the incoming air comes in contact with the liquid fuel or mixture to aid and agitate in emulsifying and vaporizing said fuel or mixture evenly within the range of the operating temperature, and a vapor outlet connected to the intake manifold and/or to the air inlet of the carburetor of a conventional internal combustion engine, such that when the engine runs, the device is subjected to a vacuum pressure to force atmospheric air to be sucked into said device through the air inlets and to provide the proper or ideal air/fuel or mixture ratio.

5 Claims, 2 Drawing Figures

MULTI-FUEL VAPOR CHARGER CARBURETION SYSTEM AND DEVICE THEREFOR

This invention relates in general to internal combustion engine, and more particularly to a new method of fuel carburetion to form a vapor charge for combustion in conventional internal combustion engine and the device therefor.

One of the most common carburetion device used today is the automobile carburetor adapted to vaporize the liquid fuel and mix it to the proper amount of atmospheric air for combustion in the combustion chamber of the engine. The finer the fuel mist formed, the better combustion of the vaporized liquid fuel will take place, thus utilizing to the maximum the heat energy of the fuel to give and produce a clean exhaust gas and a potential increase in power.

However, since the carburetor is a mechanical device, it has to be adjusted now and then, to tune and set regularly to the right setting to obtain a good or ideal air-fuel mixture.

It is also an accepted fact, that fuel in vapor form is more combustible than fuel in liquid state, such that complete combustion of the vapor fuel is more attainable than fuel in liquid form. The more complete the combustion the fuel is subjected to, the greater the heat utilization of the fuel is attained.

It is from this fact that this invention was conceived and developed.

It is therefore the principal object of this invention to provide a new method of carburetion, of producing a vapor charge adapted for combustion in a combustion chamber of an internal combustion engine and the device thereof.

It is also an object of this invention to provide a vapor charge carburetion method and device which is easily adapted on existing internal combustion engines without need of modifying the existing one.

Another object of this invention is to provide a new system of carburetion and device which is simple in construction yet efficient.

A further object of this invention is to provide a new carburetion system and device which will give the engine a clean exhaust gas.

A further object of this invention is to provide a new method and device of fuel carburetion for internal combustion engine which could be constructed and manufactured with simple devices and equipment.

Another object of this invention is to provide a new system of fuel carburetion and device which can use different kinds of liquid fuel or mixture.

These objects and other advantages of this invention will come to light and the invention will be fully and completely understood by reading the detailed description in the specification when taken in conjunction with the accompanying drawings, wherein.

Figure 1:
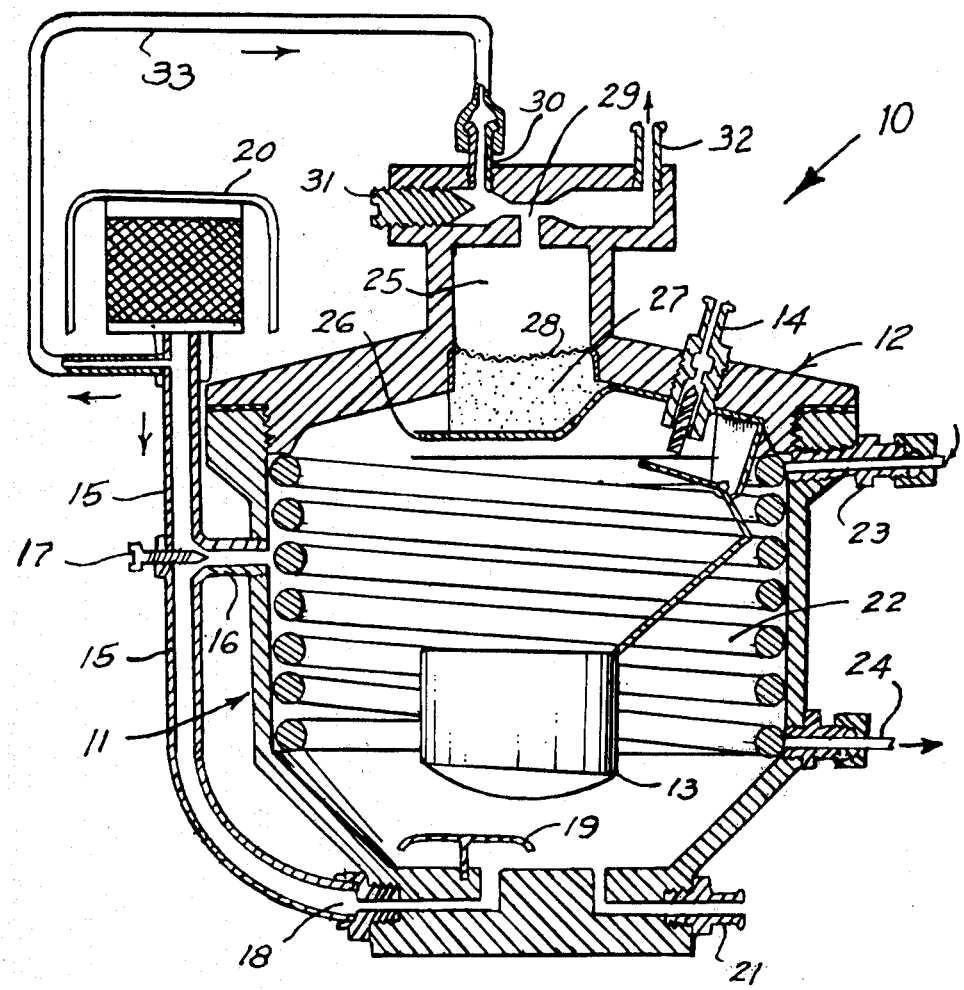
FIG. 1 is a vertical cross-sectional view of the new carburetion device.

Referring now to the drawings, there is shown in FIG. 1, the vapor charge producing device generally designated as 10. Device 10 is a bowl-shaped container 11 provided with a screwable cover 12. The container can, of course, vary in shape. The device is provided with a float 13 to control the fuel or mixture level inside the bowl by way of the fuel or mixture inlet-valve 14 made on the cover 12.

The bowl 11 is provided with an air pipe 15 having an air inlet 16 on its side and provided with a control valve 17 to control fuel or mixture agitatation and together with valve 31 to control the air/fuel or mixture ratio and to regulate the flow. Also there is an air inlet 18 made at the bottom which is provided with an air cap 19 such that the entering air is properly distributed around the bottom and be in contact with the liquid fuel or mixture as it rises up to form the vapor charge. The pipe 15 is provided with an air filter 20 and the bowl's bottom is further provided with a liquid or mixture inlet-drain 21.

Also placed inside the container 11 is a heating coil 22 with an inlet 23 and an outlet 24 for the entry of a heating medium such as the hot cooling water from the engine's radiator or the lubricating oil (not shown).

On cover 12 is formed the main vapor outlet 25 and is provided with a splash guard 26 and a foam filter 27 with a screen 28 which can be removed or replaced by similar materials such that only dry vapor charge is discharged from the bowl. The outlet has a venturi tube 29 with an inlet opening 30 provided with a control valve 31 and a final vapor discharge opening 32. An air pipe 33 is connected to the inlet opening 30 and tapped from pipe 15 just after the filter 20 or directly from the top portion of filter 20. With this connection, greater vapor flow is induced at the venturi 29.

Figure 2:
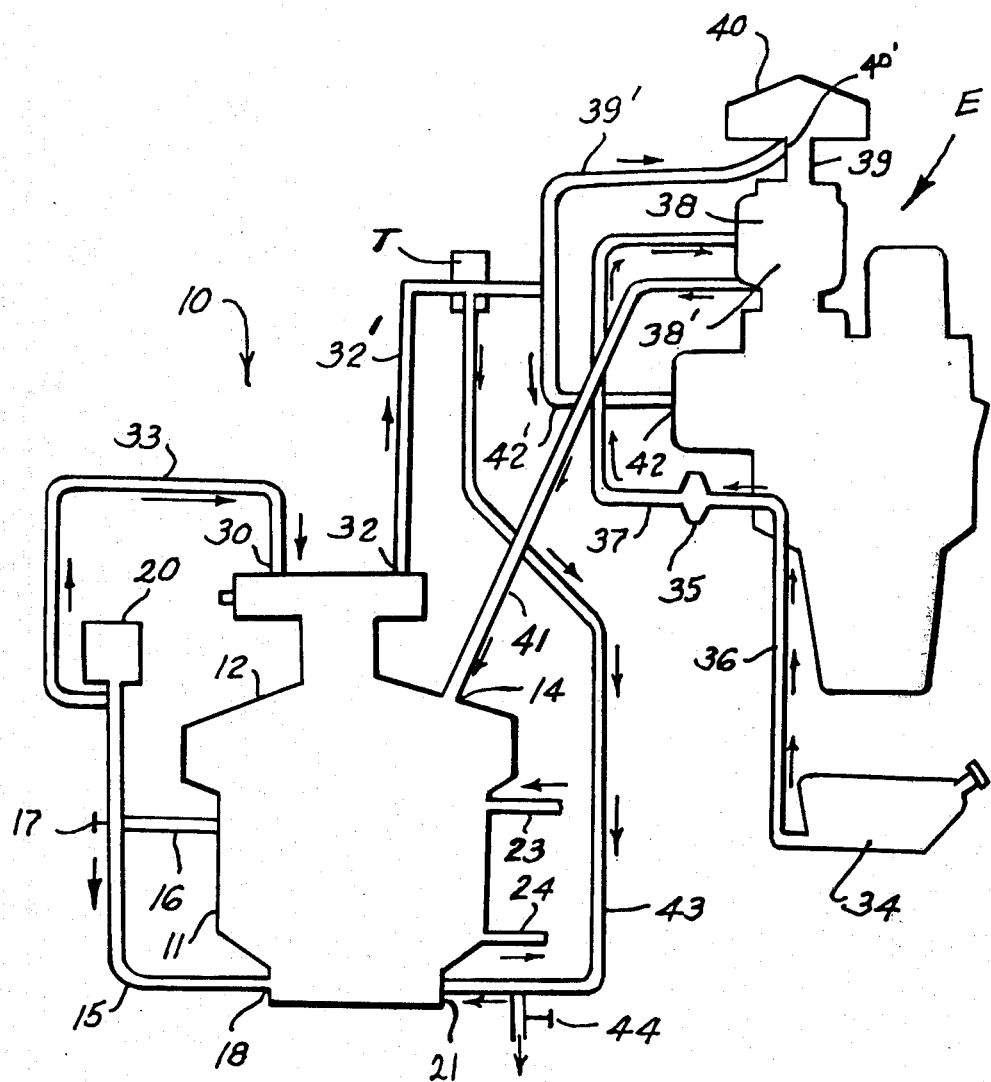
FIG. 2 is a schematic diagram of the method of fuel carburetion and device as connected to the existing internal combustion engine.

FIG. 2 shows the schematic connection of the system, which shows the vapor charge producing device 10 connected to a conventional internal combustion engine E.

Engine E is provided with a fuel tank 34 connected to a fuel pump 35 by pipe 36 and by pipe 37 which is connected to the carburetor 38. The carburetor 38 has an air inlet 39 connected to an air filter 40 which is a conventional set-up in an internal combustion engine.

Device 10 receives its fuel or mixture from the fuel pipe 41 connected to the carburetor bowl drain 38 or to the fuel line between the fuel pump and the carburetor. Vapor from the device 10 is discharge through opening 32 by pipe 32' passing through liquid trap T and is connected to the engine's intake manifold 42 by pipe 42' and to the air inlet 40' of the engine just after the air filter 40 by pipe 39' which pipe can be optionally removed. The liquid collected in trap T is sent back to device 10 by return pipe 43 which is also provided with a drain valve 44. When it is desired to drain the device 10, drain valve 44 may then be opened.

OPERATION

When the engine E is started, the fuel pump 35 starts to supply gasoline to the vapor charge producing device 10 coming from the carburetor's bowl drain 38' or anywhere between the fuel pump and the carburetor through fuel pipe 41 until the desired level as controlled by the float 13 to close the fuel inlet-valve 14. Then adjust the air-fuel mixture screw of the engines' carburetor to almost close (about $\frac{1}{4}$ to $\frac{1}{2}$ turn open) depending on the smoothest idling engine running and required idling RPM.

As the engine E runs on idling, vacuum is created in the intake manifold 42, thus also creating a vacuum in the device 10 through pipes 42' and 32' (note: there is a check valve, not shown, in pipe 39' such that the flow in pipe 39' is only towards the air filter 40 and never the reverse). As vacuum is created inside device 10, atmospheric air now enters the device through air filter 20, pipes 33, 15 and 16. As air enters the device through pipe 15 and inlet 18, air is distributed by the cap 19 around the bottom of the device to agitate the fuel or mixture causing all of the different fractions of the fuel to emulsify and evaporate evenly within the range of the operating temperature sided by the vacuum created by the intake manifold. Vapor mixes with the air entering inlet 16. As the vapor and air in the device rise upwardly passing through the foam filter liquid fuel is removed, then passes through the venturi tube 29. Since air also enters through opening 30 adjusted by control valve 31, a venturi effect is created around tube 29 aiding in a greater flow of vapor from the device 10 passing through discharge opening 32 and pipe 32' into the intake manifold 42 of the engine.

At idling speed a greater vacuum is created in the intake manifold 42 than at the filter 40, thus vapor flow from the device into the intake manifold only through pipe 42' with no flow in pipe 39'. However at high speed, a greater vacuum is created at the air inlet 39, thus vapor flow from the device through pipe 39.

After the engine has run for quite some time, cooling water and the lubricating oil become heated, and either heated medium is used to heat the devices' heating coil 22 which can be either copper, plastic or other materials not affected by the fuel being used, by introducing the heated medium through inlet 23 and then out to 24. This heating aids in the further vaporization of the fuel or mixture inside the device since liquid evaporates faster at higher temperature and also to counteract the adiabatic cooling effect of evaporating liquids. It should be stated that vaporization takes place at a lower temperature in a vacuum than at atmospheric pressure.

It will be observed that what is being injected into the intake manifold of the engine is a vapor charge (not liquid) such that optimum combustion of the fuel or mixture is assured thereby utilizing almost all the heat energy of the vapor fuel to produce a clean exhaust.

Actual test conducted with this system and device gave the following results:

At idling speed, using a 25 C.C. gasoline without the device, the conventional engine run for 121.5 seconds. However, by connecting the device as shown in FIG. 2 and using 25 c.c. of gasoline, the engine run for 239 seconds or a difference of 97%.

The test also showed that the engine was more dependent on the vapor charge produced by the device than from the carburetor (the air-fuel mixture screw was almost closed). Since the connection from the device were rubber tubings, when the line 32' was bended to cut off the vapor fuel supply, the engine stopped.

What we claim as new is:

1. A fuel vapor charge producing device comprising a pure liquid fuel or mixture container which can be of any desired shape and material with a cover and a float secured inside said device to control the inflow of pure liquid fuel or mixture into the container, a fuel or mixture inlet-valve made on said container for the entry of fuel or mixture, an air inlet adapted to allow the entry of air into said container above the liquid or mixture level and another air inlet below the fuel or mixture level such that the incoming air comes in contact with the liquid fuel or mixture to aid and agitate in emulsifying and vaporizing said fuel or mixture evenly within the range of the operating temperature, and a vapor outlet means connected to the intake manifold and/or to the air inlet of the carburetor of a conventional internal combustion engine, such that when the engine runs, the device is subjected to a vacuum pressure to force atmospheric air to be sucked into said device through the air inlets and to provide the proper or ideal air/fuel or or mixture ratio, said vapor outlet means including a venturi tube mounted on said cover and having one end connected to an air pipe and the other end connected by conduit means to the intake manifold and/or air inlet of the carburetor of an engine, a vapor outlet passage extending from said container through said cover into said venturi tube whereby a flow of vapor is induced by the venturi effect of the the venturi tube.

2. A fuel vapor charge producing device as claimed in claim 1, further comprising a heating means inside the device adapted to heat the liquid fuel or mixture inside said device such that vaporization of the fuel or mixture is enhanced and to counteract the adiabatic cooling effect of evaporating liquids.

3. The fuel vapor charge producing device of claim 1 including a splash guard extending across said vapor outlet passage within said container.

4. The fuel vapor charge producing device of claim 3, together with a filter mounted in said vapor outlet passage to separate liquid from vapor flowing through said vapor outlet passage.

5. The fuel vapor charge producing device of claim 1 wherein said venturi tube has an adjustable air control valve in said one end to vary the flow of air into said venturi tube.

* * * * *